United States Patent Office 2,804,488
Patented Aug. 27, 1957

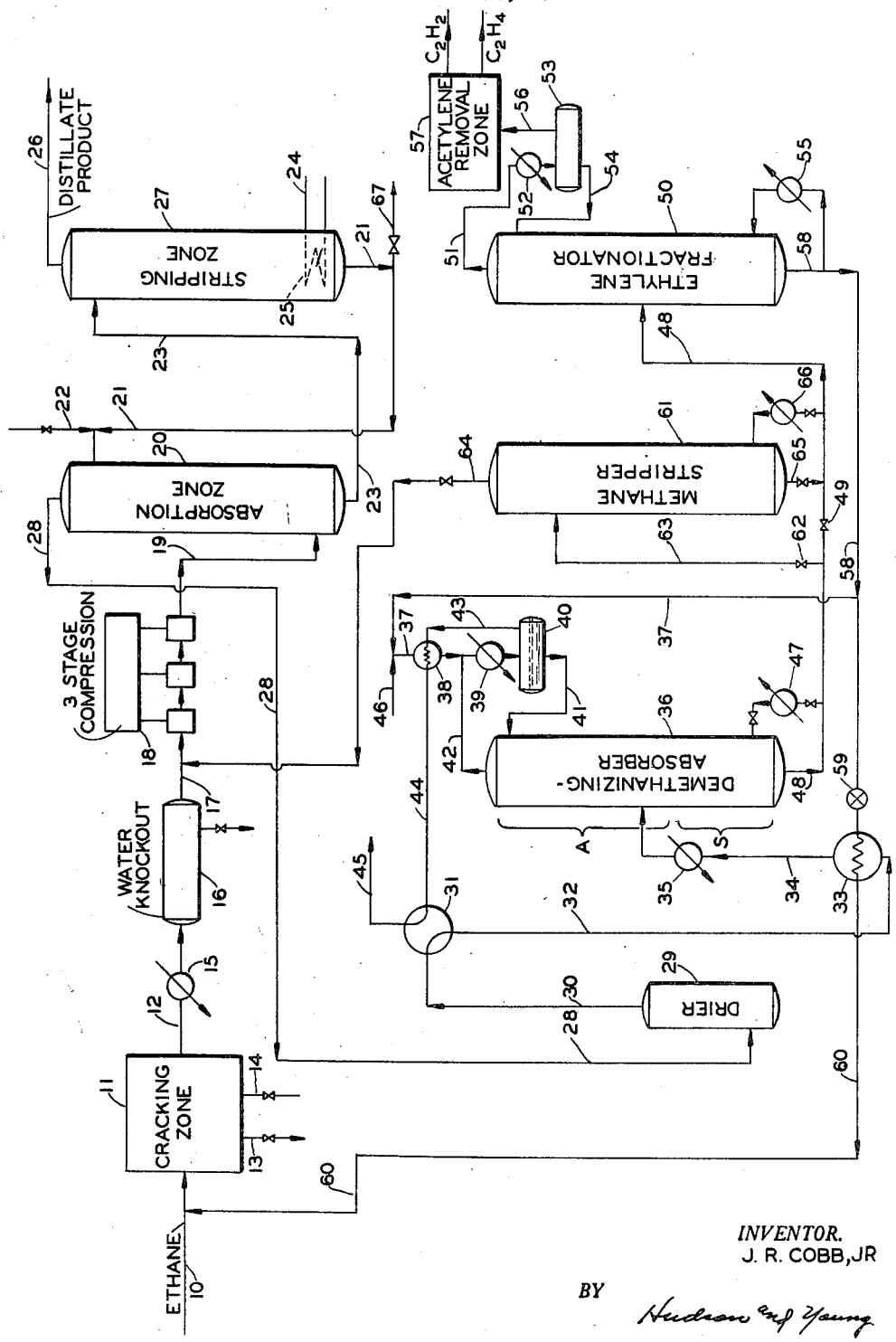

2,804,488

SEPARATION AND RECOVERY OF ETHYLENE

Joseph R. Cobb, Jr., Bartlesville, Okla., assignor to Phillips Petroleum Company, a corporation of Delaware Application December 27, 1954, Serial No. 477,837

15 Claims. (Cl. 260—683)

This invention relates to the production of ethylene. In one of its aspects this invention relates to the separation and recovery of ethylene from other hydrocarbons. In another of its aspects this invention relates to employing ethane as an absorbent in the separation and recovery of ethylene from other hydrocarbons.

Ethylene is a valuable hydrocarbon and is becoming increasingly more valuable. Ethylene can be readily produced by the pyrolysis of ethane, propane or heavier materials, including reduced crudes, by short time, high temperature pyrolysis. It can also be recovered from oil refinery gases where it is a byproduct of relatively low temperature thermal and catalytic cracking operations. High temperature cracking or pyrolysis for the production of ethylene can be carried out in the presence of hot granular refractory material or can be accomplished in tubular furnaces. At the present time the most important source materials for the production of ethylene are ethane, propane and normal butane.

Ethylene is difficult to separate from the other hydrocarbons and/or gases with which it is usually associated. It is difficult to liquefy and is usually not reactive under the conditions by which it is obtained. Consequently the problems associated with the separation and recovery of ethylene have been an obstacle to its increased use. In recent years many elaborate separation and recovery processes employing large and expensive equipment have been developed. However, in most instances the above mentioned problems still exist. Most of these processes are fractionation processes and usually comprise, basically (1) a demethanizing-absorption operation wherein methane and lighter are removed (2) a deethanizing operation wherein an ethylene-ethane fraction is separated from heavier hydrocarbons and the absorbent employed in said demethanizing-absorption operation and (3) a fractionation operation wherein ethylene is separated from the ethane in said ethylene-ethane fraction.

I have found that when ethane is employed as the absorbent in the demethanizing-absorption operation, the above referred to deethanizing operation can be eliminated. Thus, broadly speaking, my invention comprises, the employment of ethane as an absorbent in a demethanizing-absorption operation, and the combination of steps associated with said employment of ethane.

An object of this invention is to provide a process for the separation and recovery of ethylene from other gases.

Another object of this invention is to provide a process for the separation and recovery of ethylene from other gases wherein ethane is employed as a solvent.

Still another object of this invention is to eliminate a deethanizing operation, and the equipment necessary for carrying out said operation, in a process for the separation and recovery of ethylene from other gases.

Other aspects, objects and advantages of the invention will be apparent to those skilled in the art upon reading this disclosure.

Thus, according to the invention there is provided a process for the separation and recovery of ethylene from a mixture of gases comprising $C_1$ to $C_5$ plus hydrocarbons, which comprises the steps of: contacting said mixture under absorption conditions with a predominantly ethane absorbent in an absorption zone to absorb thereby $C_2$ to $C_5$ plus hydrocarbons and a portion of said $C_1$ hydrocarbon; passing the resulting rich absorbent to a stripping zone; in said stripping zone, stripping $C_1$ hydrocarbon from said rich absorbent; passing remaining rich absorbent to a fractionation zone; and fractionating said remaining rich absorbent to obtain ethylene as an overhead product and a bottoms product comprising said predominantly ethane absorbent.

By thus employing ethane as an absorbent in a demethanizing-absorption operation, the step of deethanizing the rich absorbent is completely eliminated because the ethylene can be fractionated directly from the demethanized rich absorbent. The marked advantages of (1) elimination of initial investment costs for equipment for carrying out the deethanizing operation and (2) elimination of actual operating expense for such a step, will be readily appreciated by those skilled in the art. Furthermore, the above advantages can be realized without any sacrifice in ethylene purity as will be explained further hereinafter.

The attached drawing is a highly diagrammatic flow sheet illustrating the several embodiments of the invention.

Referring now to the drawing the invention will be more fully explained. A stream of hydrocarbons, predominantly ethane, is charged through line 10 to cracking zone 11 which can be a thermal cracking zone or a catalytic cracking zone; if a thermal cracking zone the cracking can be accomplished in a tubular type furnace or can be carried out in the presence of a moving bed of hot granular refractory material. The latter is generally preferred when the cracking operation is being carried out primarily for the production of ethylene. In any event, it is to be understood that cracking zone 11 includes the necessary equipment for effecting a preliminary separation of the cracking reaction products so that a stream of gaseous effluent, comprising a mixture of $C_1$ to $C_5$ plus hydrocarbons and hydrogen, can be removed through line 12. Other heavier products of the cracking reaction can be removed through lines 13 and 14.

Said gaseous effluent is passed through cooler 15 and into water knockout drum 16 wherein water, introduced as steam in cracking zone 11, is removed. The gases are then passed through line 17 into the first stage of a three stage compression zone 18. Various intercoolers, liquid traps, etc. between the compression stages have been omitted for simplicity. Compressed effluent is passed through line 19 into absorption zone 20 wherein it is contacted countercurrently with a stream of absorbent introduced through line 21. Said absorbent on initially starting the unit can be a mineral seal oil of approximately 400–450° F. boiling range added through line 22. Enriched absorbent, having essentially all the $C_5$ plus hydrocarbons and some of the $C_3$ and $C_4$ hydrocarbons contained in said compressed effluent, is withdrawn from absorber 20 through line 23 and introduced into absorbent stripper 27 wherein the absorption oil is stripped, by means of heat introduced into reboiler coil 25 through line 24 from a source not shown, and the said absorbed hydrocarbons are removed overhead through line 26 to storage or other use as desired. The product removed through line 26 usually contains a substantial proportion of aromatics. Excess absorbent which builds up in the system after a period of time on stream is withdrawn through line 67 or removed overhead from stripper 27 through line 26. During operation the original mineral seal oil, used in starting up the system, is gradually replaced by material produced in the process. Thus after a period of time the gas stream in line 19 is contacted in absorber 20 with a stream of hydrocarbons produced in the process.

The overhead stream from absorption zone 20, comprising $C_1$ to $C_4$ hydrocarbons and hydrogen, is passed through line 28 into drier 29 containing a desiccant such as bauxite. In drier 29 the water-vapor dew point of the stream is reduced to approximately —40° F. or lower in order to prevent the formation of ice and hydrates during further processing. From drier 29 the said stream is passed through line 30, heat exchanger 31, heat exchanger 33, line 34 and refrigerated cooler 35 into the absorption section of demethanizing-absorber 36. Heat exchangers 31 and 33 are shown as single units. In actual practice each would probably be a series of heat exchangers wherein the temperature of the said $C_1$ to $C_4$ hydrocarbons and hydrogen stream is progressively reduced. In demethanizing-absorber 36 said stream is contacted counter-currently with a predominantly ethane absorbent introduced from line 37 (from a source described hereinafter), through heat exchanger 38, refrigerated cooler or condenser 39, accumulator 40 and line 41. It is to be noted that demethanizing-absorber 36 is a fractionating absorber. In operation the upper portion A functions as an absorption section and the lower portion S functions as a stripping section. Residue gas comprising hydrogen and methane, together with a small amount of $C_2$ hydrocarbons, is removed overhead through line 42 and passed via line 37 and condenser 39 into accumulator 40. Uncondensed gases are removed from said accumulator 40, through line 43, heat exchanger 38, line 44, heat exchanger 31 and passed through line 45 to fuel gas or other use.

As a further aid in preventing the formation of ice and hydrates a small amount of methanol can be introduced through line 46 when needed.

In a presently preferred embodiment of the invention, rich ethane absorbent from the absorption section A of demethanizing-absorber 36 is passed into stripping section S which is reboiled by means of heat introduced in reboiler 47. Said stripping section is operated under conditions so as to essentially completely remove methane from the said rich absorbent. Said methane passes out through line 42 as described above. Partially stripped rich absorbent, i. e., essentially completely methane free, and containing absorbed $C_2$ to $C_4$ hydrocarbons is withdrawn through line 48 and valve 49 into ethylene fractionator 50 wherein a separation between ethylene and ethane is effected, ethylene being removed overhead through line 51 and passed through partial condenser 52 into reflux accumulator 53. Distillation conditions are maintained in fractionator 50 by returning condensate from accumulator 53 as reflux through line 54 and introducing heat to the bottom of said fractionator by means of reboiler 55. Vapors from accumulator 53 are passed through line 56 to acetylene removal zone wherein acetylene is removed by contacting with dimethylformamide. Lean absorbent, predominantly ethane but containing some $C_3$ and $C_4$ hydrocarbons is withdrawn from fractionator 50 through line 58, passed through expansion valve 59 to supply refrigeration for heat exchanger 33, and returned via line 60 to cracking one 11 as a portion of the charge thereto. A portion of said lean ethane absorbent is passed through line 37 and introduced into demethanizer-absorber 36 as described above. The portion of said lean absorbent which is returned to cracking zone 11 through line 60 should be substantial in order to prevent excessive build up of $C_3$ and $C_4$ hydrocarbons in the said ethane absorbent.

In another embodiment of the invention, a methane stripper 61 is employed in series with demethanizing-absorber 36. Partially stripped rich absorbent is withdrawn from demethanizing-absorber 36 through line 48, valve 62 (valve 49 is closed), line 63 and introduced into stripper 61. Any remaining methane is removed overhead through line 64, together with a small amount of $C_2$ hydrocarbons, and introduced into line 17 ahead of compressors 18 in order to recover said $C_2$ hydrocarbons. Partially stripped rich absorbent, containing hardly more than a trace of methane, is withdrawn from stripper 61 through line 65 and passed via line 48 into ethylene fractionator 50 for fractionation and recycle of ethane absorbent as described above. Heat is supplied to said methane stripper 61 by means of reboiler 66. This embodiment of the invention is advantageously employed in some instances when due to the type of feed stock charged to the demethanizing-absorber it is more desirable to remove the last portions of methane in a separate methane stripper rather than remove all of the methane in said demethanizing absorber. When employing this embodiment of the invention reboiler 47 can be blocked out if desired, by means of the valves shown. However, it is generally preferred, at present, to carry out as much stripping of methane as practical (without incurring excess loss of $C_2$ hydrocarbons) in demethanizer-absorber 36, commensurate with the ethylene purity desired, in order to remove said methane from the system.

In still another embodiment of the invention demethanizing-absorber 36 can be operated as an absorber only, i. e., no stripping is carried out in the bottom of the tower. In such instance a stream comprising $C_1$ to $C_5$ plus hydrocarbons is charged to said absorber and contacted with a predominantly ethane absorbent to absorb thereby at least a portion of the $C_2$ to $C_5$ plus hydrocarbons. The rich absorbent is then fractionated in ethylene fractionator 50 to obtain an overhead stream consisting essentially of ethylene and a bottoms product stream comprising said predominantly ethane absorbent. However, as will be understood by those skilled in the art, when maximum purity of ethylene is desired one of the embodiments previously discussed is preferred.

The following example is a typical operation within the scope of the present invention. Those skilled in the art will understand that the different specific compositions of materials and conditions can be varied considerably without departing from the invention in its its broadest aspects and accordingly the following example is to be taken as typical and not inclusive of the invention in all respects.

*Example*

Reference is made to the attached drawing. A charge stream, predominantly ethane, is cracked thermally in the presence of a moving bed of granular refractory material in cracking zone 11 at a temperature of about 1500° F. and under about 20 p. s. i. a. pressure (pounds per square inch absolute). The composition of the charge to the cracking zone, including the recycle stream from line 60 is:

| Component: | Mols per stream day |
|---|---|
| Methane | 635 |
| Ethylene | 304 |
| Ethane | 38,392 |
| $C_3$ | 1,449 |
| $C_4$ | 617 |
| Total | 41,397 |

The composition of the gaseous effluent from cracking zone 11, after being compressed to 180 p. s. i. a. at 45° F. but before treating in absorption zone 20 is:

Component: Mols per stream day
- Hydrogen _____ 31,661
- Methane _____ 5,055
- Acetylene _____ 1,241
- Ethylene _____ 24,043
- Ethane _____ 12,324
- $C_3$ _____ 529
- $C_4$ _____ 777
- $C_5$ _____ 24
- $C_6$ _____ 8
- $C_6H_6$ _____ 84
- $C_7$ plus _____ 38
- Water _____ 83

Total _____ 75,867

Absorber 20 is a 5′3″ I. D. tower 75 feet high and contains 20 trays on 2 ft. spacings. After being treated in absorber 20 with 3,657 mols per stream day of lean oil at a temperature of 45° F. and a pressure of 180 p. s. i. a. and after being passed through drier 29 the composition of the stream is:

Component: Mols per stream day
- Hydrogen _____ 31,651
- Methane _____ 5,040
- Acetylene _____ 1,223
- Ethylene _____ 23,633
- Ethane _____ 11,989
- $C_3$ _____ 495
- $C_4$ _____ 617

Total _____ 74,648

The stream is then cooled in heat exchangers 31, 33 and cooler 35 to a temperature of −148° F., at a pressure of 150 p. s. i. a., and is introduced into demethanizing-absorber 36 which is a 3′9″ I. D. tower, 70 feet high, containing 29 trays on 2 ft. spacings. Reflux at a temperature of −148° F. is supplied to the top of tower 36 at a liquid reflux to overhead product ratio of about 0.4:1. An absorbent, predominantly ethane, is supplied through reflux accumulator 40, at a temperature of −148° F., and serves both as an absorbent and as reflux to the top of said tower. The composition and amount of said absorbent stream is:

Component: Mols per stream day
- Ethylene _____ 51
- Ethane _____ 6,621
- $C_3$ _____ 206
- $C_4$ _____ 239

Total _____ 7,117

At a temperature of −148° F. on reflux accumulator 40 and a bottom tower temperature of −60° F., the composition and amount of the net overhead stream from said demethanizer-absorber 36, removed through line 43, is:

Component: Mols per stream day
- Hydrogen _____ 31,651
- Methane _____ 5,033
- Ethylene _____ 112
- Ethane _____ 3,584

Total _____ 40,380 and the composition and amount of the bottoms stream removed from said tower 36 through line 48 is:

Component: Mols per stream day
- Methane _____ 7
- Acetylene _____ 1,223
- Ethylene _____ 23,572
- Ethane _____ 15,026
- $C_3$ _____ 701
- $C_4$ _____ 856

Total _____ 41,385

Said bottoms stream is charged at a temperature of −60° F. to ethylene fractionator 50 which is an 8 ft. diameter tower, 120 ft. high, having 52 trays on 2 ft. spacings and which is operated at a pressure of 100 p. s. i. a. An overhead stream is removed, partially condensed, and a portion returned to said tower as reflux at a liquid reflux to overhead product ratio of about 2.85:1. At a temperature of −80° F. on accumulator 53 and a bottom tower temperature of −30° F. the composition and amount of the net overhead stream removed from ethylene fractionator 50 is:

Component: Mols per stream day
- Methane _____ 7
- Acetylene _____ 1,223
- Ethylene _____ 23,220
- Ethane _____ 224

Total _____ 24,674 and the composition and amount of the bottoms stream removed from said fractionator 50 through line 58 is:

Component: Mols per stream day
- Ethylene _____ 352
- Ethane _____ 14,802
- $C_3$ _____ 701
- $C_4$ _____ 856

Total _____ 16,711

This bottoms stream, less the amount thereof supplied as the predominantly ethane absorbent to demethanizer-absorber 36 is recycled through line 60 to cracking zone 11.

The overhead from ethylene fractionator 50 is treated to remove acetylene in zone 57. The composition and amount of the ethylene product stream is:

Component: Mols per stream day
- Methane _____ 7
- Acetylene _____ Trace
- Ethylene _____ 23,208
- Ethane _____ 224

Total _____ 23,439

The above example shows that when operating according to my invention an ethylene product stream having a purity of 99 mol percent can be obtained. Furthermore, at the heart of the process, i. e., the separation of the ethylene, only two towers, (1) a demethanizer and (2) an ethylene fractionator, are employed. Prior art processes require three towers, (1) a demethanizer, (2) a deethanizer and (3) an ethylene fractionator. The advantages thus resulting from my invention, from the standpoint of initial investment and operating expense, will be readily appreciated by those skilled in the art. Furthermore, said advantages are realized without any sacrifice of product purity.

Operating conditions on the units of the process can be varied according to the source of the ethylene containing stream and the purity of product desired. As will be understood by those skilled in the art these conditions can vary as follows:

|  | Broad Range | Preferred Range |
|---|---|---|
| Demethanizing Absorber: |  |  |
| Feed to Tower, ° F | 0 to −200 | −110 to −150 |
| Top of Tower, ° F | −110 to −200 | −110 to −150 |
| Bottom of Tower, ° F | −30 to −110 | −60 to −100 |
| Pressure, p. s. i. a | 40 to 200 |  |
| Ethylene Fractionator: |  |  |
| Feed to Tower, ° F | [1] −30 to −110 / [2] −105 to −135 | −60 to −100 |
| Top of Tower, ° F | −65 to −150 |  |
| Bottom of Tower, ° F | −15 to −120 |  |
| Pressure, p. s. i. a | 15 to 125 |  |

[1] When feed is from demethanizer 36.
[2] When feed is from methane stripper 61.

When methane stripper 61 is employed as described above the operating conditions therein can vary as follows:

| Methane Stripper | Broad Range | Preferred Range |
| --- | --- | --- |
| Feed to Tower, °F | −30 to −110 | −60 to −110 |
| Top of Tower, °F | −110 to −140 | |
| Bottom of Tower, °F | −105 to −135 | |
| Pressure, p. s. i. a | 20 to 125 | |

Operating conditions on cracking zone 11, absorber 20, the pressure to which the gaseous effluent is compressed, etc., will all vary with the type of cracking employed in cracking zone 11 and the type of feed stock charged thereto. When charging a feed stock predominantly ethane, and cracking in the presence of a moving bed of hot granular refractory material, the cracking can be carried out at a temperature within the range of 1300–1800° F. and a pressure within the range of 10–35 p. s. i. a. In general the operating conditions on these units will be chosen to obtain the desired results. For example if propanes and butanes are cracked different cracking conditions would prevail. The amount of $C_3$, $C_4$ and $C_5$ plus materials to be removed in absorber 20 would be increased and operating conditions on said absorber would be changed accordingly.

Herein and in the claims, unless otherwise stated, the term "$C_1$ to $C_5$ plus hydrocarbons" refers to and includes $C_1$, $C_2$, $C_3$, $C_4$, and $C_5$ hydrocarbons plus small amounts of $C_6$ and $C_7$ hydrocarbons sometimes associated therewith in hydrocarbon mixtures. In said term, $C_1$ refers to methane; $C_2$ refers to and includes all hydrocarbons containing two carbon atoms per molecule such as acetylene, ethylene and ethane; $C_3$ refers to and includes all hydrocarbons containing three carbon atoms per molecule such as propylene and propane; $C_4$ refers to and includes all hydrocarbons containing four carbon atoms per molecule such as butenes, iso-butenes, butane, isobutane, and butadiene; $C_5$ refers to and includes all hydrocarbons containing five carbon atoms per molecule such as pentenes, pentadienes, iso-pentenes, pentane, and iso-pentanes.

From the above it will be apparent to those skilled in the art that the invention described herein represents a distinct contribution to the art of ethylene manufacture and recovery. Thus, use of the invention in said art should result in even more widespread and more economical use of ethylene, which is used as a raw material in the manufacture of ethylene glycol, other hydrocarbons by alkylation, and plastics such as polyethylene.

While the invention has been described as applied to an ethylene containing stream obtained from ethane cracking the invention is not so limited. The invention is applicable to any ethylene containing stream, obtained from any source, which can be processed as described herein.

As will be evident to those skilled in the art, various modifications of this invention can be made, or followed, in the light of the foregoing disclosure and discussion, without departing from the spirit or scope of the disclosure or from the scope of the claims.

I claim:

1. A process for the separation and recovery of ethylene from a mixture of gases comprising $C_1$ to $C_5$ plus hydrocarbons, which comprises the steps of: contacting said mixture under absorption conditions with a predominantly ethane absorbent in an absorption zone to absorb thereby $C_2$ to $C_5$ plus hydrocarbons and a portion of said $C_1$ hydrocarbon; passing the resulting rich absorbent to a stripping zone; in said stripping zone, stripping $C_1$ hydrocarbon from said rich absorbent; passing remaining rich absorbent to a fractionation zone; and fractionating said remaining rich absorbent to obtain ethylene as an overhead product and a bottoms product comprising said predominantly ethane absorbent.

2. A process for separating and recovering ethylene from a mixture of $C_1$ to $C_5$ plus hydrocarbons and hydrogen which comprises the steps of: contacting said mixture under absorption conditions with a predominantly ethane absorbent in an absorption zone to absorb thereby $C_2$ to $C_5$ plus hydrocarbons and a portion of said $C_1$ hydrocarbon; passing the resulting rich absorbent to a stripping zone; stripping $C_1$ hydrocarbon from said rich absorbent in said stripping zone; passing remaining rich absorbent to a fractionation zone; and fractionating said remaining rich absorbent to obtain ethylene as an overhead product and a bottoms product comprising said predominantly ethane absorbent.

3. A process for separating and recovering ethylene from a mixture of $C_1$ to $C_5$ plus hydrocarbons and hydrogen which comprises the steps of: contacting said mixture under absorption conditions with a predominantly ethane absorbent in an absorption zone to absorb thereby $C_2$ to $C_5$ plus hydrocarbons and a portion of said $C_1$ hydrocarbon; passing the resulting rich absorbent to a stripping zone; stripping $C_1$ hydrocarbon from said rich absorbent in said stripping zone; passing remaining rich absorbent to a fractionation zone; fractionating said remaining rich absorbent to obtain ethylene as an overhead product and a bottoms product comprising said predominantly ethane absorbent; and returning a portion of said bottoms product to said absorption zone as the said ethane absorbent employed therein.

4. A process for separating and recovering ethylene from a mixture of $C_1$ to $C_5$ plus hydrocarbons and hydrogen which comprises the steps of: contacting said mixture under absorption conditions with a predominantly ethane absorbent in an absorption zone to absorb thereby $C_2$ to $C_5$ plus hydrocarbons and a portion of said $C_1$ hydrocarbon; passing the resulting rich absorbent to a first stripping zone; in said first stripping zone, stripping a portion of said absorbed $C_1$ hydrocarbon from said rich absorbent; passing said partially stripped rich absorbent to a second stripping zone; stripping substantially all of the remaining $C_1$ hydrocarbon from said partially stripped rich absorbent in said second stripping zone; passing remaining rich absorbent to a fractionation zone; fractionating said remaining rich absorbent to obtain ethylene as an overhead product and a bottoms product comprising said predominantly ethane absorbent; and returning a portion of said bottoms product to said absorption zone as the said ethane absorbent employed therein.

5. A process for the production of ethylene which comprises: cracking a stream of normally gaseous hydrocarbons in a cracking zone under cracking conditions to produce a cracking zone gaseous effluent containing hydrogen and $C_1$ to $C_5$ plus hydrocarbons; compressing said effluent; passing said compressed effluent to a first absorption zone and therein removing substantially all of said $C_5$ plus hydrocarbons and a portion of said $C_3$ and $C_4$ hydrocarbons; contacting the resulting mixture of hydrogen and $C_1$ to $C_4$ hydrocarbons with a predominantly ethane absorbent under absorption conditions in a second absorption zone to absorb thereby $C_2$ to $C_4$ plus hydrocarbons and a minor portion of said $C_1$ hydrocarbon; passing the resulting rich absorbent to a stripping zone; stripping $C_1$ hydrocarbon from said rich absorbent in said stripping zone; passing remaining rich absorbent to a fractionation zone; fractionating said remaining rich absorbent to obtain ethylene as an overhead product and a bottoms product comprising said predominantly ethane absorbent; returning a portion of said bottoms product to said second absorption zone as the said ethane absorbent employed therein; and returning another portion of said bottoms product to said cracking zone as a portion of the charge thereto.

6. A process for the production of ethylene which comprises: cracking a stream of normally gaseous hydrocarbons in a cracking zone under cracking conditions to produce a cracking zone gaseous effluent containing hydrogen and $C_1$ to $C_5$ plus hydrocarbons; compressing said effluent; passing said compressed effluent to a first absorption zone and therein removing substantially all of said $C_5$ plus hydrocarbons and a portion of said $C_3$ and $C_4$ hydrocarbons; contacting the resulting mixture of hydrogen and $C_1$ to $C_4$ hydrocarbons with a predominantly ethane absorbent under absorption conditions in a second absorption zone to absorb thereby $C_2$ to $C_4$ plus hydrocarbons and a minor portion of said $C_1$ hydrocarbons; passing the resulting rich absorbent to a first stripping zone; in said first stripping zone, stripping a portion of said absorbed $C_1$ hydrocarbon from said rich absorbent; passing said partially stripped rich absorbent to a second stripping zone; in said second stripping zone, stripping substantially all of the remaining $C_1$ hydrocarbon from said partially stripped rich absorbent; passing remaining rich absorbent to a fractionation zone; fractionating said remaining rich absorbent to obtain ethylene as an overhead product and a bottoms product comprising said predominantly ethane absorbent; returning a portion of said bottoms product to said second absorption zone as the said ethane absorbent employed therein; and returning another portion of said bottoms product to said cracking zone as a portion of the charge thereto.

7. A process according to claim 5 wherein said stream of normally gaseous hydrocarbons is predominantly ethane, said cracking in said cracking zone is carried out in the presence of hot granular refractory material, and said first absorption zone comprises a liquid-liquid contacting zone wherein said compressed effluent is contacted countercurrently with a stream of distillate produced in the process.

8. A process according to claim 6 wherein said stream of normally gaseous hydrocarbons is predominantly ethane, said cracking in said cracking zone is carried out in the presence of hot granular refractory material; and said first absorption zone comprises a liquid-liquid contacting zone wherein said compressed effluent is contacted countercurrently with a stream of hydrocarbons produced in the process.

9. A process for the separation and recovery of ethylene from a mixture of gases comprising $C_1$ to $C_5$ plus hydrocarbons, which comprises the steps of: compressing said mixture; passing said compressed mixture to a first absorption zone and therein removing substantially all of said $C_5$ plus hydrocarbons and a portion of said $C_3$ and $C_4$ hydrocarbons; contacting the resulting mixture comprising $C_1$ to $C_4$ hydrocarbons with a predominantly ethane absorbent under absorption conditions in a second absorption zone to absorb thereby $C_2$ to $C_4$ plus hydrocarbons and a minor portion of said $C_1$ hydrocarbon; passing the resulting rich absorbent to a stripping zone; stripping $C_1$ hydrocarbon from said rich absorbent in said stripping zone; passing remaining rich absorbent to a fractionation zone; fractionating said remaining rich absorbent to obtain an overhead stream consisting essentially of ethylene and a bottoms product stream comprising said predominantly ethane absorbent; and returning a portion of said bottoms product to said absorption zone as the said ethane absorbent employed therein.

10. A process for the separation and recovery of ethylene from a mixture of gases comprising $C_1$ to $C_5$ plus hydrocarbons, which comprises: contacting said mixture under absorption conditions with a predominantly ethane absorbent in an absorption zone to absorb thereby at least a portion of the $C_2$ to $C_5$ plus hydrocarbons; passing rich absorbent to a fractionation zone; and fractionating said rich absorbent to obtain an overhead stream consisting essentially of ethylene and a bottoms product stream comprising said predominantly ethane absorbent.

11. A process according to claim 2 wherein said predominantly ethane absorbent contains at least 82.5 mol percent ethane.

12. A process according to claim 9 wherein said predominantly ethane absorbent contains at least 82.5 mol percent ethane.

13. A process for separating and recovering ethylene from a mixture of $C_1$ to $C_4$ plus hydrocarbons and hydrogen which comprises in combination, the steps of: passing said mixture to a demethanizing-absorber zone having a stripping section and an absorption section; contacting said mixture in said absorption section under absorption conditions with a predominantly ethane absorbent so as to absorb thereby $C_2$ to $C_4$ plus hydrocarbons and a portion of said $C_1$ hydrocarbon; passing the resulting rich absorbent from said absorption section to said stripping section; stripping $C_1$ hydrocarbon from said rich absorbent in said stripping section; passing remaining rich absorbent to a fractionation zone; and fractionating said remaining rich absorbent to obtain overhead from said fractionation zone a product stream consisting essentially of ethylene, and a bottoms product stream comprising said predominantly ethane absorbent.

14. A process according to claim 13 wherein said predominantly ethane absorbent contains at least 82.5 mol percent ethane.

15. A process for the production of ethylene which comprises, in combination, the steps of: cracking a stream of normally gaseous hydrocarbons in the presence of a granular refractory material in a cracking zone at a temperature within the range of 1300 to 1800° F. and a pressure within the range of 10 to 35 p. s. i. a. to produce a cracking zone gaseous effluent containing hydrogen and $C_1$ to $C_5$ plus hydrocarbons; compressing said effluent; passing said compressed effluent to a first absorption zone and therein removing substantially all of said $C_5$ plus hydrocarbons and a portion of said $C_3$ and $C_4$ hydrocarbons from said compressed effluent; passing the resulting mixture of hydrogen and $C_1$ to $C_4$ hydrocarbons at a temperature within the range of $-110$ to $-150°$ F. to a demethanizing-absorber zone having an absorption section and a stripping section; maintaining the top of said absorption section at a temperature within the range of $-110$ to $-150°$ F., the bottom of said stripping section at a temperature within the range of $-60$ to $-100°$ F., and maintaining said demethanizing-absorber zone under a pressure within the range of 40 to 200 p. s. i.; in said absorption section contacting said resulting mixture with a predominantly ethane absorbent containing at least 82.5 mol percent ethane so as to absorb said $C_2$ to $C_4$ plus hydrocarbons and a minor portion of said $C_1$ hydrocarbons; passing the resulting rich absorbent from said absorption section to said stripping section; in said stripping section stripping $C_1$ hydrocarbon from said rich absorbent; passing remaining rich absorbent from said stripping section to a fractionation zone; maintaining the top of said fractionation zone at a temperature within the range of $-65$ to $-150°$ F., the bottom of said fractionation at a temperature within the range of $-15$ to $-120°$ F., and maintaining said fractionation zone under a pressure within the range of 15 to 125 p. s. i. a.; in said fractionation zone, fractionating said rich absorbent to obtain an overhead stream consisting essentially of ethylene, and a bottoms product stream comprising said predominantly ethane absorbent; returning a portion of said bottoms product stream to said absorption section as the said predominantly ethane absorbent employed therein; and returning another portion of said bottoms product stream to said cracking zone as a portion of the charge thereto.

References Cited in the file of this patent

UNITED STATES PATENTS

| | | |
|---|---|---|
| 2,226,467 | Hjerpe et al. | Dec. 24, 1940 |
| 2,263,557 | Greenewalt | Nov. 25, 1941 |
| 2,498,806 | Hachmuth | Feb. 28, 1950 |